July 10, 1945.   M. N. ROBERTSON   2,380,121
FOOD STORAGE EQUIPMENT
Filed July 9, 1942

WITNESS:
Robt R Mitchel

INVENTOR
Mabel Nixon Robertson
BY
ATTORNEYS.

Patented July 10, 1945

2,380,121

UNITED STATES PATENT OFFICE 2,380,121

FOOD STORAGE EQUIPMENT

Mabel Nixon Robertson, Philadelphia, Pa.

Application July 9, 1942, Serial No. 450,267

4 Claims. (Cl. 126—20)

This invention relates to equipment for the storage of cooked foods over extended periods of time capable of maintaining them in savory condition.

This application is in part a continuation of my prior applications Serial Nos. 46,626 and 170,074, filed, respectively, October 24, 1935, and October 20, 1937.

It is common experience that foods, after their cooking is finished, cannot, with relatively few exceptions, be kept in palatable condition for any substantial period of time, irrespective of the many expedients which have been adopted to maintain them at various temperatures under various conditions of ambient atmosphere, or by making provision for cooling and reheating. Different foods react differently to various conditions of attempted storage but almost universally in an extremely detrimental fashion so far as their palatability is concerned. Some, for example, become too dry, others soggy, and still others tend to the formation of surface conditions rendering them not only unpalatable, but of very unsatisfactory appearance.

In accordance with the present invention, there is provided a type of equipment capable of embodiment in various forms, but adapted for the preservation of food, after cooking, for many hours in substantially the condition in which it would be served under normal conditions immediately after the cooking. The equipment, in other words, serves to stabilize the food against changes, and long experience has shown that practically all, if not all, foods may be thus stabilized under conditions which are essentially the same for all of them.

The utility of such equipment will be obvious. Heretofore it has been the universal practice to try to complete the cooking of foods immediately before they are served. This requires the presence of the cook in both time and place substantially at the serving. While such a condition may be achieved under well regulated and controlled conditions, the circumstances under which that is impossible, difficult or costly are very numerous. For example, in many households, the various members thereof have irregular hours of departure or arrival, making very difficult the tasks of whoever does the cooking. Under such circumstances, it is obviously very desirable to have a provision for storage of food in proper condition for eating, so that the cooking for one or more meals of one or more parties may be accomplished simultaneously, desirably with a provision for immediate self-service on the part of irregular members of the household, so that they will not be burdened with any additional necessities for reheating or in any way performing part of the food preparing operation. These considerations apply, for example, where a mother is obliged to work and desires, nevertheless, to prepare hot food for children at the time they return home for a noon recess. In accordance with the present invention, the food for luncheon may be cooked in the early morning, and the children may take it from the storage equipment wherein it will be at precisely the temperature proper for serving, with no temperature existing in the storage apparatus sufficiently high to produce burns if the apparatus and food is handled even quite carelessly by small children.

Equipment of this type is also desirable under many other conditions. For example, in accordance with the invention food may be precooked and then stored and transported on vehicles such as aircraft, army trucks, railroads or busses to be consumed en route with avoidance of any provision for galleys or of stops for the purpose of enabling the passengers to secure food at restaurants or the like. For private and pleasure use, the equipment may be carried in automobiles, so that a party making a long journey may have cooked food at any desired point along the journey, or a group may, for example, hold a picnic at some remote place without the necessity for cooking thereat. It will be obvious that these applications of the invention to travelling are particularly useful in the case of military expeditions or transportation, or for the carrying of hot properly cooked food to people isolated in relatively inaccessible places by flood or the like or by reason of military operations.

Further uses of the invention which may be cited are those involved in hospitals, bomb shelters or apartment houses where unavoidable delays between cooking and delivery of the food may occur or where it may merely be desirable to provide the food at one time and leave the time of its consumption to the convenience or desire of the party to be served.

It will be evident that the above and other uses will require substantial variations in size, shape and mobility of the equipment, but as will be evident from the following description, the principles of the invention are susceptible of embodiment in an extremely wide range of particular forms of equipment, and consequently, the invention will be described, having the objects apparent from the above discussion, in a form suitable for household use.

The fashion in which the invention is carried out and the accomplishment of the general objects indicated above will be apparent from the following description, read in conjunction with the accompanying drawing, in which.

Before describing the operation of the apparatus, its physical nature will be indicated. In the form illustrated it comprises a cabinet 2 standing on legs which may be provided with casters if it is desirable to move the apparatus about. The cabinet consists of top, bottom, side and back walls, all formed primarily of heat insulating material. The particular fashion in which this cabinet is constructed is relatively immaterial, and it may be said that in general the construction is desirably one of the conventional types used for refrigerators, i. e., having inner and outer surfaces of sheet material providing an intervening space for the reception of insulating cork, fiber, or the like. Just as in the case of refrigerators, the economy of operation depends upon the degree of heat insulation applied, since transfer of heat through the walls determines the frequency, in this instance, of the operation of a heating element to maintain a desired interior temperature.

Figure 3:
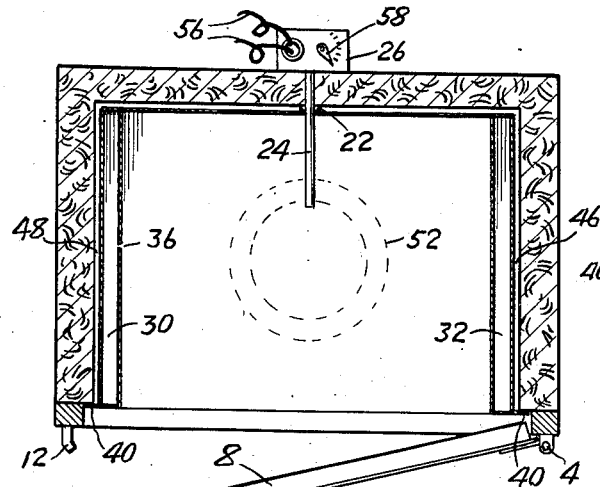
Figure 3 is a horizontal section through the equipment taken below the upper wall of the cabinet on the plane the trace of which is indicated at 3—3 in Figure 1.
Figure 4:
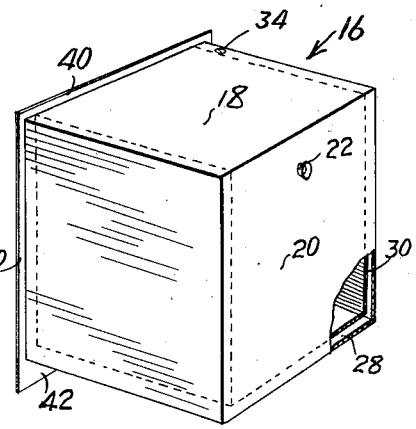
Figure 4 is a perspective view, partially broken away, to illustrate the nature of a removable interior member.
Figure 1:
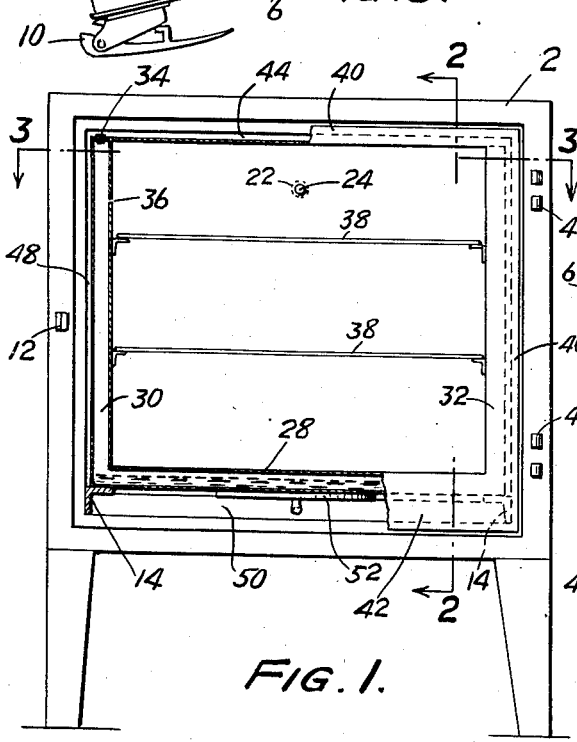
Figure 1 is a front elevation, partially in section, showing a household embodiment of the equipment in the form of a cabinet having the door thereof removed.
Figure 2:
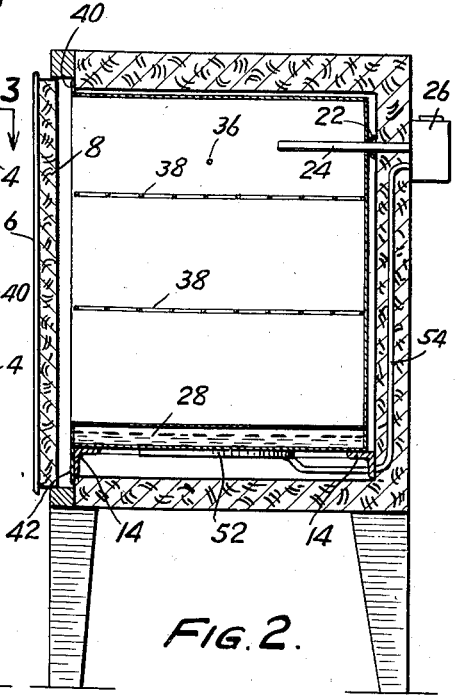
Figure 2 is a vertical section through the same on the plane the trace of which is indicated at 2—2 in Figure 1.

The cabinet is closed by a door 6 hinged at 4 and of insulating type, as indicated by the portion 8 containing an insulating filler. This door likewise may conform with conventional refrigerator practice and is adapted to be latched by the cooperation of elements indicated at 10 and 12. Within the cabinet, there are provided supporting brackets 14 arranged to carry an interior member indicated at 16 and illustrated in perspective in Figure 4. This member 16 comprises top and back walls which may consist of sheets of metal and side and bottom portions, indicated at 28, 30 and 32, in the form of communicating chambers forming a U-shaped arrangement providing a lower water chamber 28 and vapor legs 30 and 32, the entire structure being formed of sheet metal.

The device is under the control of a thermostat, indicated at 24, connected to an adjustable control and relay arrangement conventionalized at 26. The sensitive element of this thermostat enclosed in the tube 24 is located within the upper portion of the removable member 16, and for this purpose the tube is fixed permanently in the rear wall of the cabinet, and extends through a flanged opening indicated at 22 in the rear wall 20 of the member 16, desirably with a relatively tight fit to prevent any substantial degree of communication between the interior of 16 and an air space behind the wall 20. In one or both of the legs 30 or 32 of the cabinet there are located one or more restricted openings 36, for example one or more holes of about one-eighth inch diameter or the equivalent, preferably near the upper portions thereof, as indicated. One of the vapor legs is also provided with a filling plug indicated at 34 through which water may be introduced and drained. Within the member 16 are supported trays or racks, indicated at 38, preferably of a grid type formed of heavy wire.

The member 16 is provided with flanges, indicated at 40, and 42, at its front end, extending outwardly from all four edges thereof, the bottom flange 42 being enlarged to bridge the space 50 below the member 16. These flanges, as indicated in the various figures, are adapted to overlap inwardly directed shoulders or ledges at the front edges of the cabinet walls and to be engaged by the door and pressed thereagainst when the door is closed, thereby closing off air spaces 44, 46, 48 and 50 about the top, the sides, and the bottom of the member 16. These air spaces are desirable, though not necessary, for the maintenance of as uniform temperature conditions as possible, as will be apparent from the following description of the operation.

Located in the air space 50 is an electrical heater 52, comprising, for example, a conventional coil of resistance wire supported upon an insulating base. The flow of electricity through this heater 52 is controlled by the thermostatic switching means in the box 26, to which it is connected by the cable 54. The electrical energy is supplied through leads 56, adapted to be connected to a source of current, while the temperature at which the thermostat effects its control may be adjusted through a suitable range by means of a knob or pointer 58, which may also serve to cut off the current when the device is not in use. The particular thermostat and heater used will depend upon the voltage of the source of current. In ordinary household uses, for example, the voltage will be 110 volts, and the parts will be designed accordingly. On the other hand, in the case of automotive vehicles, the parts may be designed for operation at 6 volts, connection being made to the battery and generator systems of the vehicle. For farm uses, 32 volts may ordinarily be employed.

In the use of this equipment, water is provided in the bottom portion of the U-shaped chamber provided at 28, 30 and 32. The particular amount of water used is quite immaterial, though desirably the water level is below the interior bottom of the member 16, so that this bottom and the legs 30 and 32 are subject to contact with aqueous vapor only.

In preparation for use, the cabinet is closed and preheated by switching on the current with the thermostat desirably set to provide a constant temperature in the vicinity of 160° F. It has been found very satisfactory, for example, to use a thermostat nominally set for this temperature, but of a relatively inexpensive type adapted to turn on the current at about 150° F. and to turn it off at about 170° F., as indicated by the sensitive element 24 of the thermostat.

After the cabinet is brought to the proper temperature (or even at a quite substantially lower temperature, since the food as initially placed therein will generally be considerably above 160° F.) the freshly cooked food may be placed therein and the cabinet then maintained closed with the current on. While desirably the door should not be opened more than necessary, no substantial detrimental effect occurs if the door is open for limited periods for placing into the cabinet new food, dishes to be maintained warm, or the like, or for the removal of food from time to time. Nor, in fact, is it detrimental if the door does not fit tightly and permits a reasonably small leakage of air or vapor from the interior of the cabinet.

It is desirable that the heater 52 should not be so large as to effect rapid rise of temperature between the limits of operation of the thermostat. It has been found desirable for example, with a reasonably insulated cabinet in a room of ordinary temperature, to have the heater of such size that the current is on approximately fifteen minutes and then off for approximately one and three-quarter hours, so that there results a temperature cycle having a period of approximately two hours. These figures are subject to variations of several hundred per cent., but are cited merely to indicate that the thermostatic control need not be of the highly sensitive type used for scientific apparatus adapted, for example, to maintain temperature limits within a fraction of a degree or to insure rapid heating if the temperature falls slightly below the nominal controlled temperature.

The operation of the equipment may be explained as follows, which explanation will serve to indicate the design considerations involved in constructing the equipment in varying sizes and for varying purposes; but it is not to be understood that this description is necessarily completely accurate, even though it is well substantiated by observation of effects over a long period of time.

As the food is placed in the cabinet, and this is desirably effected in open dishes rather than in closed ones, with free communication between the various types of foods in the cabinet, the temperature of the foods will generally be substantially above 160° F., since their various cooking temperatures will all, in general, be at or substantially above the boiling point of water. When they are first placed in the cabinet, therefore, aqueous vapor will escape therefrom and condense on the walls of the member 16 and on the inner wall of the door 6 which, in effect forms the sixth wall of this member 16. Relatively little escape of water vapor and condensation will occur, however, and, in fact, only an amount comparable to that normally lost in the handling of food between the completion of the cooking and prompt serving. Within a few minutes an equilibrium within the apparatus will be attained with the parts at substantially the same temperature.

The cycle which thereafter takes place may best be described by starting with a minimum temperature condition within the apparatus resulting in the starting of flow of current through the heater. At such time, for example, the temperature in the vicinity of the thermostat 24 (and, in fact, throughout the apparatus) may be, say, 150° F. When the current is turned on, heat from the heater 52, which as stated above is quite gradually applied, the heater being of minimum size to maintain proper operation, will be applied to the water within the chamber 28. As the temperature of the water rises, its vapor pressure will increase and consequently some evaporation will occur, causing vapors to rise within the upright chambers 30 and 32 as well as to appear above the liquid level at the top of the chamber 28. This vapor will be constantly at a slightly greater temperature than the interior of the member 16, and consequently heat transfer will occur through the inner walls bounding the vapor chambers and condensation will take place on the walls of these chambers. This rise of temperature will, of course, not only occur on the inner walls of the chambers, but on their exterior walls as well, heating the air within the regions 44, 46 and 48, with a result that a uniform air temperature is achieved in these locations and heat is transferred to the inner wall of the cabinet proper, inside the insulation thereof. The heat from the inner walls of the vapor chambers and from the back wall 20 and top 18, which will be heated by the air, will be radiated inside the chamber 16 to effect heating of the air therein and the food and its containers.

Due to the slow heating effected not only because of the small size of the heater 52, but by reason of the high specific heat and high latent heat of vaporization of water, all of this heat transfer just described will occur without the setting up of any substantial gradients in the vapor spaces, the parts of the member 16 and the interior thereof, and, in fact, the interior walls of the member 16 will be essentially at the same temperature at all times during the heating cycle. As a result, there will at no time be any such condition as the existence of a hot or cold spot within the member 16 from which evaporation can take place or on which condensation will occur in any selective fashion. The result of this is to produce to an extremely high degree the utter absence of any circulating air or vapor currents within the member 16, with the result that vapors from one food will not reach the vicinity of any other, nor will any portion of any food be subject to air currents to accelerate evaporation of liquid therefrom.

The heating of the food as the temperature rises toward the upper limit of the control would normally be expected to raise the vapor pressure of the liquids in the food and so produce some evaporation. The arrangement, however, is such that that action is held down to a very great extent by reason of the provision of the opening or openings 36. Despite the fact, as stated, that all of the parts within the interior of the insulation of the cabinet (except the heater itself and its immediate vicinity) are substantially at the same temperature, it will be evident that since the heating of the food compartment is effected through the vapor, the vapor during the heating period must be at a slightly higher temperature than the food compartment. The result is that the vapor pressure in the chambers 30 and 32 is slightly greater than in the food compartment, so that a flow of vapor into the latter will occur very slowly through the opening 36, due to this pressure difference. This flow is a mere slight seepage of vapor at a rate insufficient to create any appreciable currents of air or vapor and, in fact, at such a low rate that normal diffusion maintains the vapor content in the food compartment practically uniform throughout its entire volume without the setting up of air currents. The result of the fact that vapor enters at 36 due to this pressure gradient means, however, that the equilibrium partial pressure of aqueous vapor in the food compartment is attained by reason of this influx of water vapor rather than by evaporation from the food. The substantial identity of temperature, however, prevents any appreciable condensation of the vapor on the food, and the result, therefore, is that through any heating cycle the moisture contained in the food remains substantially constant.

During a subsequent cooling cycle, the conditions are reversed, though with a cycle of the type described, for example, in which the cooling period may be as long as an hour and a half or upwards, the gradients of both pressure and temperature will be very much less than during a heating cycle. The cooling takes place by loss of heat through the insulation of the cabinet. As a consequence, the air in the regions 44, 46 and 48 and the vapor in the chambers 28, 30 and 32 become cooler slightly more rapidly than the food in the food compartment. The equilibrium, therefore, may involve a slight retransfer of vapor through the opening 36 into the vapor leg 30. Primarily, however, this reversal of the cycle may, if the apparatus remains closed, result in a very slight condensation on the inner walls of the food compartment. Inasmuch as the temperature drops only a matter of about 20° F. at the most, and since the temperature is very substantially below the boiling point of water at atmospheric pressure, the actual amount of condensation will be very slight, quite insufficient to produce the appearance of any droplets of a size which might drop upon the food.

As a matter of fact, even this condition is avoided by reason of inevitable leakage through the door of the cabinet, and over long periods of time with the cabinet closed there has been observed no evidence of any substantial amount of condensation.

Following the cooling period, the reheating again begins as described above. It will be evident that under the conditions of the closed cabinet described there are produced none of the phenomena of evaporation, condensation, or circulating air currents which will tend to modify in any way the moisture condition of the food.

A disturbance of the conditions described will occur every time the cabinet is opened for the purpose of placing in the cabinet, or taking out of it, any of the food. The result of opening the cabinet is, of course, to drop slightly the temperature of the interior thereof, so that in general shortly after closure a heating cycle will begin. By reason of the opening, the atmosphere within the cabinet will be replaced by relatively dry air from the room which would immediately tend to require the evaporation of some liquid from the food to obtain equilibrium. Again, however, the heating cycle tends to neutralize any such evaporation by reason of the production of the slightly higher vapor pressure in the vapor legs causing vapor to enter the opening 36 and promote an equilibrium condition in addition to the action of evaporation of water from the food. While, therefore, repeated opening and closing of the cabinet is likely to be slightly detrimental to the food, the detriment will only be of the order of that which would be occasioned by a delay, between the cooking of the food and serving in usual fashion, equal to the total time during which the cabinet door is open. With any reasonable care, this will, of course, be a matter of but a few minutes. An adverse effect on the food will be entirely unnoticeable provided reasonable care be exercised in maintaining the door closed as much as possible.

While not essential, the air space surrounding the vapor legs and walls of the member 16 is desirable not only for additional insulation against the exterior conditions, but to provide by air convection currents for uniform heating of the metal walls.

As a result of the above, under normal conditions of use the food may be maintained for many hours in substantially the same condition which it would have if promptly served after cooking.

The temperature of approximately 160° F. which has been mentioned above has no critical connection with the physics of the operation of the device, as will be evident from the above discussion, and it will be quite clear that the same operation will result with temperatures substantially above, as well as substantially below, this temperature. The temperature of 160° F., however, has been mentioned because it is the temperature which most cooked foods desirably have when placed on the table, i. e., it is an ideal serving temperature from which the foods gradually drop during the course of a meal. Furthermore, it is approximately a minimum temperature consistent with this, and at the same time, a temperature at which cooking effects are substantially absent, i. e., food maintained at that temperature is not undergoing cooking, whereas if the temperature is substantially closer to the boiling point of water, an effect of prolonged cooking may be produced. While, therefore, this temperature is specified as an approximation, it will be understood that for proper operation reasonable departures from this as an average are within the scope of the invention.

For the proper attainment of the equilibriums described, it is desirable that, while the cabinet be exteriorly very well insulated, the interior parts should be metallic to promote heat transfer to as great an extent as possible. However, it is feasible to make the parts of the member 16 of other than metallic materials, for example, of glass, plastics, or the like, since the slow heating and cooling cycles will result in equilibrium conditions even if relatively poor heat conductors are involved in the structural parts.

While a form of the invention has been described suitable for home and similar use, it will be evident that the particular physical embodiment of the invention may be widely varied to produce more portable equipment or equipment of substantially larger capacities. In large capacity equipment it may be desirable to split up a very large food chamber volume by the presence of intermediate vapor legs, and to provide multiple or extended heating units, so that no part of an enlarged compartment may be too widely spaced from the source of heat. The description of the apparent fashion in which the equipment functions will clearly indicate to those skilled in the art the precautions to be taken to maintain operation as described.

What I claim and desire to protect by Letters Patent is:

1. Apparatus of the type described for the maintenance of cooked foods at elevated serving temperatures for extended periods of time comprising a heat-insulated housing, means for closing said housing against transfer of air to or from the exterior thereof, means providing a food compartment within said housing, means providing a vapor compartment within said housing, said food and vapor compartments having contiguous areas of substantial extent for free heat conduction between them, means providing communication between said compartments restricted so that seepage of vapor between them may occur due substantially solely to small differences of vapor pressures in the compartments resulting from small temperature differences and so that there is prevented the creation of any substantial convection currents in the food compartment by the vapor, means for applying heat to water within said vapor compartment, the vapor compartment spacing the heating means from the food compartment so that heating of the food compartment by the heating means can occur substantially only by transmission of heat from the vapor compartment, said means for applying heat being characterized by doing so at such low rate, in conjunction with said free heat conduction between the compartments and their common insulation against their surroundings, as to prevent substantial temperature differences from existing between the food and vapor compartments, and means under control of the temperature within the food compartment for regulating the action of the heating means to maintain the temperature within the food compartment within a narrow range substantially below the boiling point of water.

2. Apparatus of the type described for the maintenance of cooked foods at elevated serving temperatures for extended periods of time comprising a heat-insulated housing, means for closing said housing against transfer of air to or from the exterior thereof, means providing a food compartment within said housing, means providing a vapor compartment within said housing, said food and vapor compartments having contiguous areas of substantial extent for free heat conduction between them, the vapor compartment having vapor legs extending upwardly to embrace said food compartment, means providing communication between said compartments restricted so that seepage of vapor between them may occur due substantially solely to small differences of vapor pressures in the compartments resulting from small temperature differences and so that there is prevented the creation of any substantial convection currents in the food compartment by the vapor, means for applying heat to water within said vapor compartment, the vapor compartment spacing the heating means from the food compartment so that heating of the food compartment by the heating means can occur substantially only by transmission of heat from the vapor compartment, said means for applying heat being characterized by doing so at such low rate, in conjunction with said free heat conduction between the compartments and their common insulation against their surroundings, as to prevent substantial temperature differences from existing between the food and vapor compartments, and means under control of the temperature within the food compartment for regulating the action of the heating means to maintain the temperature within the food compartment within a narrow range substantially below the boiling point of water.

3. Apparatus of the type described for the maintenance of cooked foods at elevated serving temperatures for extended periods of time comprising a heat-insulated housing, means for closing said housing against transfer of air to or from the exterior thereof, means providing a food compartment within said housing, means providing a vapor compartment within said housing, said food and vapor compartments having contiguous areas of substantial extent for free heat conduction between them, the food and vapor compartments being spaced from the housing throughout substantial portions of their exterior surfaces to provide an air space, means providing communication between said compartments restricted so that seepage of vapor between them may occur due substantially solely to small differences of vapor pressures in the compartments resulting from small temperature differences and so that there is prevented the creation of any substantial convection currents in the food compartment by the vapor, means for applying heat to water within said vapor compartment, the vapor compartment spacing the heating means from the food compartment so that heating of the food compartment by the heating means can occur substantially only by transmission of heat from the vapor compartment, said means for applying heat being characterized by doing so at such low rate, in conjunction with said free heat conduction between the compartments and their common insulation against their surroundings, as to prevent substantial temperature differences from existing between the food and vapor compartments, and means under control of the temperature within the food compartment for regulating the action of the heating means to maintain the temperature within the food compartment within a narrow range substantially below the boiling point of water.

4. Apparatus of the type described for the maintenance of cooked foods at elevated serving temperatures for extended periods of time comprising a heat-insulated housing, means for closing said housing against transfer of air to or from the exterior thereof, means providing a food compartment within said housing, means providing a vapor compartment within said housing, said food and vapor compartments having contiguous areas of substantial extent for free heat conduction between them, the vapor compartment having vapor legs extending upwardly to embrace said food compartment, means, comprising at least one small opening between a vapor leg of the vapor compartment and the upper portion of the food compartment, providing communication between said compartments restricted so that seepage of vapor between them may occur due substantially solely to small differences of vapor pressures in the compartments resulting from small temperature differences and so that there is prevented the creation of any substantial convection currents in the food compartment by the vapor, means for applying heat to water within said vapor compartment, the vapor compartment spacing the heating means from the food compartment so that heating of the food compartment by the heating means can occur substantially only by transmission of heat from the vapor compartment, said means for applying heat being characterized by doing so at such low rate, in conjunction with said free heat conduction between the compartments and their common insulation against their surroundings, as to prevent substantial temperature differences from existing between the food and vapor compartments, and means under control of the temperature within the food compartment for regulating the action of the heating means to maintain the temperature within the food compartment within a narrow range substantially below the boiling point of water.

MABEL NIXON ROBERTSON.